United States Patent
Nir et al.

(10) Patent No.: US 12,242,803 B2
(45) Date of Patent: Mar. 4, 2025

(54) HIERARCHICAL ONTOLOGY MATCHING WITH SELF-SUPERVISION

(71) Applicant: Microsoft Technology Licensing, LLC, Redmond, WA (US)

(72) Inventors: Oron Nir, Herzeliya (IL); Inbal Sagiv, Kfar Saba (IL); Fardau Van Neerden, Driel (NL)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 17/853,310

(22) Filed: Jun. 29, 2022

(65) Prior Publication Data
US 2024/0005094 A1    Jan. 4, 2024

(51) Int. Cl.
*G06F 7/00* (2006.01)
*G06F 16/31* (2019.01)
(Continued)

(52) U.S. Cl.
CPC .......... *G06F 40/247* (2020.01); *G06F 16/313* (2019.01); *G06F 16/3344* (2019.01);
(Continued)

(58) Field of Classification Search
CPC ...... G06F 16/313; G06F 16/36; G06F 16/367; G06F 16/3344; G06F 16/2468;
(Continued)

(56) References Cited

U.S. PATENT DOCUMENTS 8,326,842 B2 * 12/2012 Vadlamani ............ G06F 16/338
707/748
10,560,734 B2   2/2020 Jassin et al.
(Continued)

FOREIGN PATENT DOCUMENTS

CN    115390066 A    11/2022

OTHER PUBLICATIONS

"Non Final Office Action Issued in U.S. Appl. No. 17/853,086", Mailed Date: Sep. 27, 2023, 25 Pages.
(Continued)

*Primary Examiner* — Mohammad A Sana
(74) *Attorney, Agent, or Firm* — Holzer Patel Drennan

(57) ABSTRACT

An ontology matching system performs operations to refine a natural language processing (NLP) model that encodes terms of a first hierarchical ontology and of a second hierarchical ontology as embeddings in a latent space. The operations include performing at least a first round of triplet loss training to decrease separation between select pairs of the embeddings sampled from the different ontologies that satisfy a first hierarchical relation while increasing separation between other pairs of the embeddings that do not satisfy the first hierarchical relation. The system then determines, from the refined NLP model, a stable matching scheme that matches each term in the first hierarchical ontology with a corresponding term of the second hierarchical ontology. Responsive to receiving terms of the first hierarchical ontology from an application, the system uses the stable matching scheme to map each of the terms to corresponding terms of the second hierarchical ontology.

20 Claims, 7 Drawing Sheets

(51) Int. Cl.
*G06F 16/334* (2025.01)
*G06F 16/36* (2019.01)
*G06F 40/247* (2020.01)
*G06N 5/01* (2023.01)

(52) U.S. Cl.
CPC ............ *G06F 16/36* (2019.01); *G06F 16/367* (2019.01); *G06N 5/01* (2023.01)

(58) Field of Classification Search
CPC .. G06F 16/328; G06F 16/3338; G06F 16/248; G06F 40/247; G06F 40/30; G06F 40/284; G06N 5/01
See application file for complete search history.

(56) References Cited

U.S. PATENT DOCUMENTS

| | | | |
|---|---|---|---|
| 10,936,630 | B2 | 3/2021 | Ronen et al. |
| 10,963,501 | B1* | 3/2021 | Ramachandrappa ..... G06F 7/32 |
| 11,386,095 | B2* | 7/2022 | Ali ........................ G06F 16/243 |
| 2015/0106078 | A1 | 4/2015 | Chang |
| 2015/0286713 | A1 | 10/2015 | Zhang et al. |
| 2017/0109373 | A1* | 4/2017 | Sung ........................ H04L 69/22 |
| 2018/0357259 | A1* | 12/2018 | Jin ............................ G06N 3/08 |
| 2021/0081699 | A1 | 3/2021 | Ronen et al. |
| 2021/0295822 | A1 | 9/2021 | Tomkins et al. |
| 2021/0312304 | A1* | 10/2021 | Keena ..................... G06N 20/00 |
| 2021/0350915 | A1 | 11/2021 | Letinic |
| 2022/0005463 | A1 | 1/2022 | Bender et al. |
| 2024/0004915 | A1 | 1/2024 | Nir |

OTHER PUBLICATIONS

"International Search Report and Written Opinion Issued in PCT Application No. PCT/US23/022472", Mailed Date: Aug. 10, 2023, 12 Pages.

"International Search Report and Written Opinion Issued in PCT Application No. PCT/US23/022613", Mailed Date: Aug. 7, 2023, 13 Pages.

Song, et al., "Multi-Domain Ontology Mapping Based on Semantics", In Journal of Cluster Computing, vol. 20, Issue 4, Aug. 8, 2017, pp. 3379-3391.

Final Office Action mailed on Feb. 20, 2024, in U.S. Appl. No. 17/853,086, 28 pages.

Notice of Allowance mailed on Jun. 14, 2024, in U.S. Appl. No. 17/853,086, 10 pages.

Nir, et al., "CAST: Character labeling in Animation using Self-supervision by Tracking", In Repository of arXiv:2201.07619v1, Jan. 19, 2022, 19 Pages.

Notice of Allowance mailed on Oct. 10, 2024, in U.S. Appl. No. 17/853,086, 10 pages.

* cited by examiner

HIERARCHICAL ONTOLOGY MATCHING WITH SELF-SUPERVISION

CROSS-REFERENCE TO RELATED APPLICATIONS

This application is related by subject matter to U.S. patent application Ser. No. 17/853,086 entitled "ONTOLOGY CUSTOMIZATION FOR INDEXING DIGITAL CONTENT" and filed on Jun. 29, 2022, which is specifically incorporated herein by reference for all that it discloses and teaches.

BACKGROUND

Natural Language Processing (NLP) is a form of artificial intelligence that gives machines the ability to "understand" aspects of written language, such as by measuring semantic similarities to decipher contextual nuances. NLP models typically embed terms as vectors in high dimensional space with distances between each pair of vectors correlating with a learned degree of semantic similarity of the two corresponding terms. Each NLP model may be understood as being built or trained to understand a single primary ontology. For example, an ontology may be a collection of medical texts, a database of entertainment media content, or even the collection of webpages available at Wikipedia.org.

SUMMARY

According to one implementation, a method for ontology matching includes performing operations to refine a natural language processing (NLP) model that encodes terms of a first hierarchical ontology and of a second hierarchical ontology as embeddings in a vector space in which spatial proximity between the embeddings is correlated with similarity between the associated terms. The refinement operations include at least a first round of triplet loss training effective to decrease separation between select pairs of the embeddings sampled from different ontologies that satisfy a first hierarchical relation while increasing separation between other pairs of the embeddings that do not satisfy the first hierarchical relation. The method further includes determining, from the refined NLP model, a stable matching scheme that matches each term in the first hierarchical ontology with a corresponding term of the second hierarchical ontology. Responsive to receiving a group of terms of the first hierarchical ontology from an application, the stable matching scheme is used to map each received term in the group of the first hierarchical ontology to a corresponding term of the second hierarchical ontology; and the set of mapped terms from the second hierarchical ontology are returned to the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
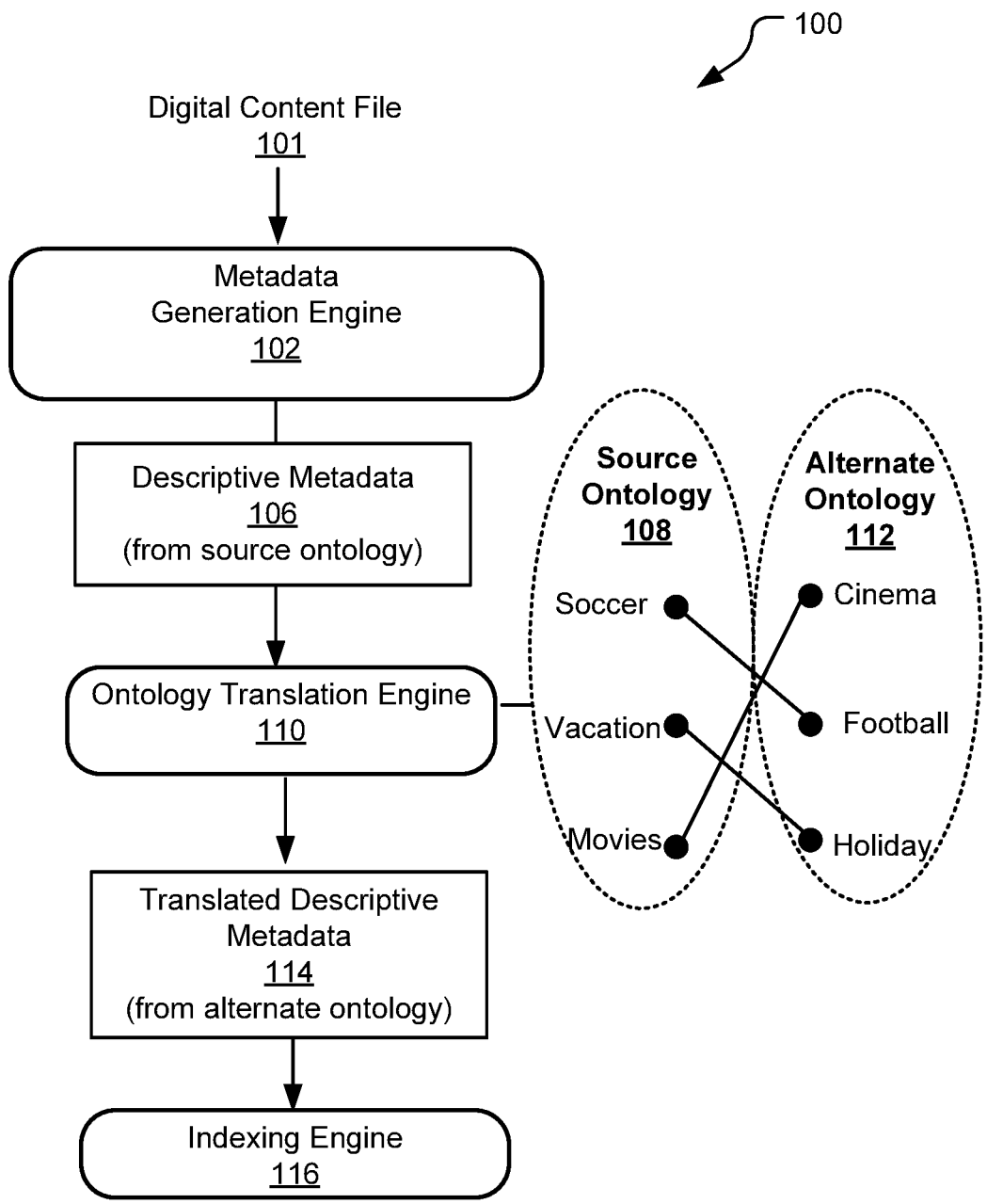
FIG. 1 illustrates an example system that includes an ontology translation engine configured to translate each term of a first hierarchical ontology to a corresponding most semantically similar term of a second hierarchical ontology.

An ontology is a set of concepts and categories in a subject area or domain that shows their properties and the relations between them. Ontology Matching (OM) constitutes the task of establishing correspondences between semantically related identities from different ontologies. Ontology matching may have applicability in a variety of fields; however, one salient example is metadata generation for digital content indexing. Various service providers may provide digital content indexing services that utilize NLP models to generate metadata, such as relevant keywords and categories, to help make digital content (e.g., images, text files, audio, video) more searchable. For example, a digital content indexing service may use a metadata generation engine that receives inputs such as keywords parsed from a title of a media file, from an audio transcript, or generated by facial recognition and optical character recognition (OCR) software. In response to receipt of such inputs, the metadata generation engine may leverage learned semantic associations of an NLP model to generate additional metadata (tags and categories) that can be appended to the digital content to make it more searchable when stored in a database.

Although a number of tools that generate metadata (e.g., keywords) for indexing digital content exist, these tools are typically designed to utilize a specific ontology of terms. Some digital content owners may prefer to index their digital content with keywords from an ontology that is different from the ontologies used by these available tools.

For example, the media domain has multiple media standards such as terms commonly used by the International Press and Telecommunications Counsel (IPTC) and the international advertising bureau (IAB) that may be used to tag media/advertisement content for video categorization and indexing purposes. Certain enterprises may wish to index digital content with these ontologies or others, such as proprietary ontologies. As there is no one centralized ontology to generalize across all domains, there exist applications that could benefit from an artificial intelligence (AI) platform that performs ontology matching.

The herein disclosed technology uses machine learning (ML) techniques to facilitate ontology matching with respect to terms of any two hierarchy-based ontologies such that any term within a first one of the ontologies can be readily mapped to a most semantically similar term of the other ontology.

According to one implementation, an ontology translation engine performs ontology matching in accord with a stable matching scheme that is derived, at least in part, by executing self-supervised techniques that refine a hierarchy-based natural language processing (NLP) model to understand relations more accurately between terms of different hierarchical ontologies and/or relations defined within individual hierarchical ontologies. It is immaterial if the NLP model has previously been made aware (through training) of the existence of the hierarchical structure defining the relations between the terms. As these model refinement techniques are self-supervised, implementation can be achieved without manual effort. Further, the techniques may be employed even if the items within each ontology do not have labeled data such as textual descriptions.

In one implementation, an ontology translation engine disclosed herein is implemented as an "add-on" to an existing metadata generation engine (or other software tool) that uses an NLP model to identify and output terms that are defined within a first hierarchical ontology. The ontology translation engine receives the output terms of the first hierarchical ontology and matches each received term with a semantically most similar term of a second hierarchical ontology.

FIG. 1 illustrates an example system 100 that includes an ontology translation engine 110 that receives as input terms of a first hierarchical ontology (e.g., a source ontology 108) and that outputs a set of corresponding, most semantically-similar terms of a second hierarchical ontology (e.g., an alternate ontology 112).

Although the ontology matching engine 110 may be used in a variety of different systems for different purposes, one relevant use case illustrated by FIG. 1 is electronic file indexing. In a variety of scenarios, content owners utilize keywords, such as categories, to index digital content and make it more searchable, such as to facilitate keyword or category-based queries to databases of video files, audio files, images, executable, text, and other content. These generated keywords and categories are collectively referred to herein as "descriptive metadata," which may be understood as generated content that is appended to or otherwise associated with source content for indexing purposes.

In FIG. 1, a metadata generation engine 102 is an example of a publicly available tool that analyzes digital content to generate descriptive metadata 106. The descriptive metadata 106 includes terms selected from a first ontology, referred to herein as the source ontology 108, for which the metadata generation engine 102 was initially designed. Certain users of the metadata generation engine 102 may prefer to index their digital content with terms selected from a second ontology (the alternate ontology 112) with which the metadata generation engine 102 is unfamiliar. This ontology matching is facilitated by the ontology translation engine 110, which is described below and with respect to the other figures herein.

In one implementation, the metadata generation engine 102 extracts information from a digital content file 101 (e.g., a title, description, audio transcript, text identified from OCR software, faces identified from facial recognition software) and identifies terms in the source ontology 108 that are semantically related to the extracted information. These related terms are output as the descriptive metadata 106. For example, the digital content file 101 may be an image, an audiobook, text file, video, sound clip, individual video frame, or executable content (e.g., a video game), and the output descriptive metadata 106 may include keywords (tags), categories, or other information that is descriptive of the digital content file 101.

In various implementations, the metadata generation engine 102 may generate the descriptive metadata 106 in different ways. In one implementation, the metadata generation engine 102 applies static rules and constraints to identify and output relative terms of the source ontology 108. In another implementation, the metadata generation engine 102 includes one or more trained ML models that execute ML logic to generate the descriptive metadata 106. For example, the metadata generation engine 102 may include a trained natural language processing (NLP) model (not shown) that encodes terms of the source ontology 108 as vectors in higher-dimensional space (e.g., tens or hundreds of dimensions) with mathematical distances between pairs of vectors correlating with a learned degree of semantic similarity of the corresponding terms. Examples of NLP models of this type include sequence-to-sequence (Seq2Seq) models or transformer models, such as BERT (Bidirectional Encoder Representations from Transformers). Notably, some transformer language models encode each term as a single high dimensional vector (e.g., a Word embedding), while others may embed each term as multiple different high dimensional vectors that can be combined, concatenated, or used in the alternative (depending on the application), to facilitate a dot product or cosine similarity comparison of a pair of terms. For example, some versions of BERT used embeddings of a classification token (the CLS token) as the representation for classification tasks.

Regardless of the specific method(s) employed to generate the descriptive metadata 106, the terms in the descriptive metadata 106 are to be understood as terms that are defined within the source ontology 108. The ontology translation engine 110 receives the descriptive metadata 106 output by the metadata generation engine 102 and translates each term of the source ontology 108 to an identified "most-similar" term in an alternate ontology 112. Both the source ontology 108 and the alternate ontology 112 are hierarchical ontologies, meaning that there exists a known hierarchical structure interrelating the items of the ontology in terms of parent/child relations (e.g., representing categories, subcategories, and items). For example, each term in the source ontology 108 and the alternate ontology 112 is defined as a node in a tree-like structure that defines categories, subcategories, etc.

In one implementation, the ontology translation engine 110 references a pre-derived matching scheme to translate each term of the descriptive metadata 106 that is of the source ontology 108 to a corresponding most semantically similar term of the alternate ontology 112. The identified, most semantically similar terms are output by the ontology translation engine 110 as translated descriptive metadata 114. In one implementation, the matching scheme of the ontology translation engine 110 is derived by employing one or more self-supervised machine learning techniques to refine of an NLP model followed by automated operations that analyze the refined model to identify a stable matching scheme that defines a "best match" term for each term of the source ontology 108 and the alternate ontology 112.

In the system 100, the translated descriptive metadata 114 is provided to an indexing engine 116 that indexes the digital content file 101 in a database in association with the translated descriptive metadata 114 such that the terms within the translated descriptive metadata 114 can be used as keywords in a search engine query to identify the digital content file 101 within a database.

Indexing digital content is just one of many potential applications for the ontology translation engine 110. The ability to translate each term in a first ontology to a corresponding "best match" term in a second ontology may also facilitate low-effort modification of a variety of existing NLP tools to facilitate applications of those tools that may depend upon an ontology different that is different than the ontology for which the tool(s) were initially designed to utilize. For example, the ontology translation engine 110 essentially repurposes the metadata generation engine 102 to facilitate generation of metadata terms of the alternate ontology 112 without modifying code within the metadata generation engine 102.

Figure 2:
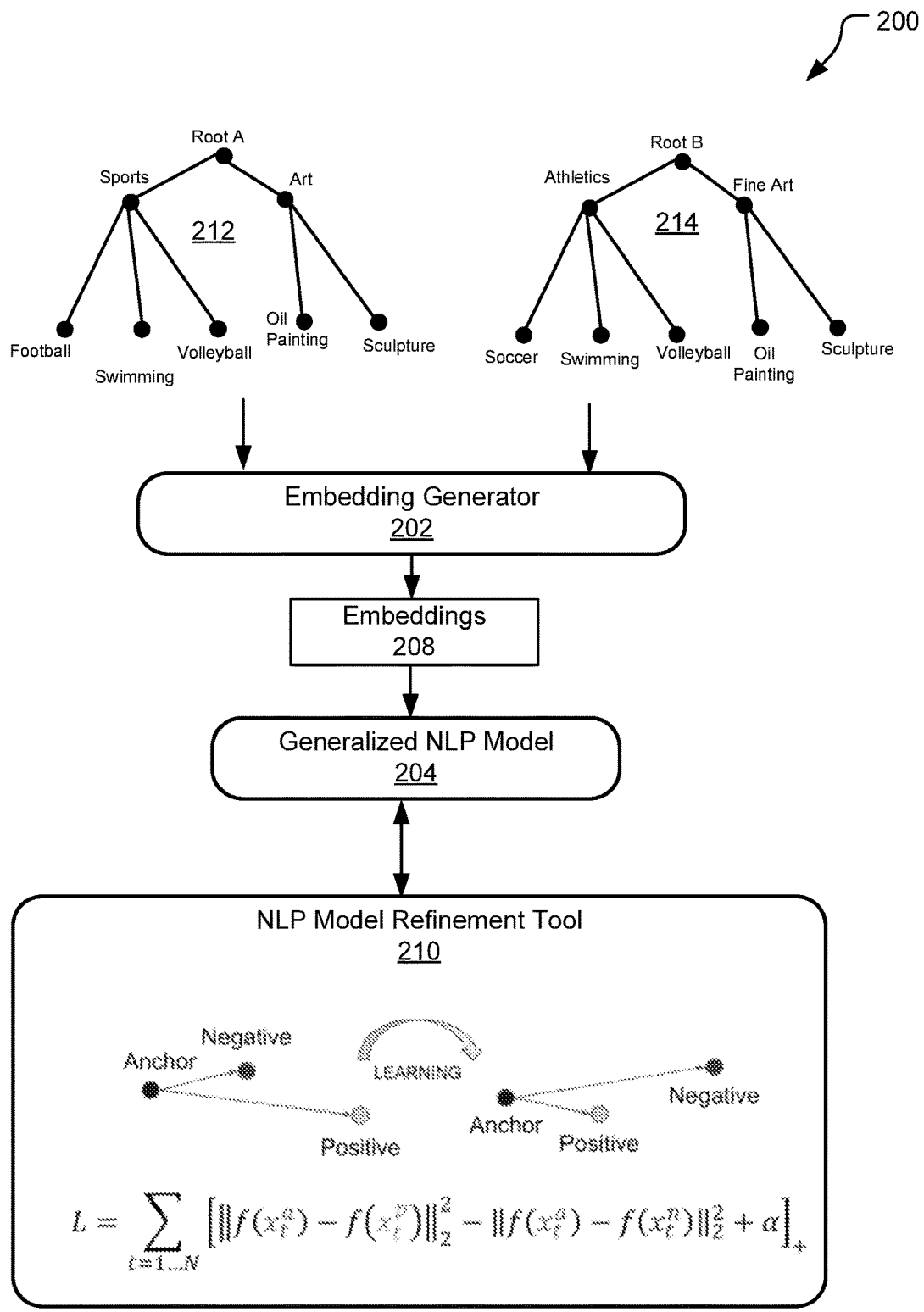
FIG. 2 illustrates example aspects of a system used to derive a stable ontology matching scheme that may be implemented by an ontology translation engine.

FIG. 2 illustrates example aspects of a system 200 used to derive a stable ontology matching scheme that is usable to translate a term defined within a first hierarchical ontology 212 to a most-similar term in a second hierarchical ontology 214. Among other software-based components, the system 200 includes a generalized NLP model 204, which may be understood as a language model that is trained on an expansive dataset, such as millions of pages from the internet. For example, the generalized NLP model 204 is a BERT language model that encodes each of millions of English-language terms as an embedding (a high dimensional vector) within a vector space where the distance between embeddings correlates with similarity between the associated terms.

In such a model, terms of the first hierarchical ontology 212 and the second hierarchical ontology 214 may already be represented in some form. That is, the generalized NLP model 204 may include a vector representation (embedding) for each term in the first hierarchical ontology 212 and each term in the second hierarchical ontology 214. In preparation for operations to refine the generalized NLP model 204, an embedding generator 202 may check to ensure that each term of the first hierarchical ontology 212 and the second hierarchical ontology 214 is already defined within the vector space used by the generalized NLP model 204. If any given term in the two ontologies is not yet present in the generalized NLP model 204, an embedding generator 202 may generate corresponding embeddings 208 and add such embedding to the generalized NLP model 204.

In one implementation, the generalized NLP model 204 is a model exclusively trained on terms included in the first hierarchical ontology 212 and the embedding generator 202 generates an embedding for each term of the second hierarchical ontology 214. These embeddings are added to the vector space of the generalized NLP model 204 prior to the refinement operations performed by the NLP model refinement tool 210.

Depending on the type of NLP model and training techniques employed, the generalized NLP model 204 may have different degrees of understanding of the terms within the two ontologies. If not previously provided with specific training inputs indicative of the hierarchical relations between terms in the two ontologies, the generalized NLP model 204 may lack an understanding such relations. Consequently, the generalized NLP model 204 may be unable to make reliable predictions that depend upon the hierarchical relations in either or both of the two ontologies, let alone accurately identify semantically similar terms across different ontologies. For example, the generalized NLP model 204 may include embeddings for each of the terms "quantum physics", "quantum computing", "software as a service", "Quantum of Solace" (a 2008 James Bond film) and "Quantum Leap" (a U.S. television series which aired between 1989 and 1993). Depending on the type of training employed, the separations between these embeddings in vector space may not reflect the fact "quantum physics" is more similar to "quantum computing" or "software as a service" than to the movie "Quantum of Solace" or to the television series "Quantum Leap."

To abridge these gaps, an NLP model refinement tool 210 performs techniques to educate the generalized NLP model 204 about the existence and nature of hierarchical relations within each of the two ontologies. According to one implementation, the NLP model refinement tool 210 applies a self-supervised training technique known as "triplet loss" in a particular manner that improves the ability of the generalized NLP model 204 to understand similarities and differences across the two ontologies and within them individually. Triplet loss training applies a loss function for MIL algorithms that provides for comparing a reference input, called an "anchor", to another input, called the "positive", where the positive and the anchor are items selected because they share some commonality. In triplet loss training, the anchor and the positive are further compared to a third input, called a "negative" that does not share the commonality with the positive and the anchor. For each triplet selected, the loss function minimizes the distance from the anchor to the positive while maximizing the distance from the anchor to the negative.

When applied to high dimensional vector space such as the embeddings in the generalized NLP model 204, triplet loss has the effect of moving select pairs of embeddings closer to one another when they jointly satisfy predefined commonalities and of moving other select pairs of embedding further apart in the vector space when they do not jointly satisfy such commonalities. Per the disclosed techniques, the predefined commonalities include different types of common hierarchical relations that a human could readily decipher when examining tree-like structures representing different hierarchical ontologies. Examples of triplet loss training techniques are discussed in greater detail with respect to FIG. 3.

Figure 3:
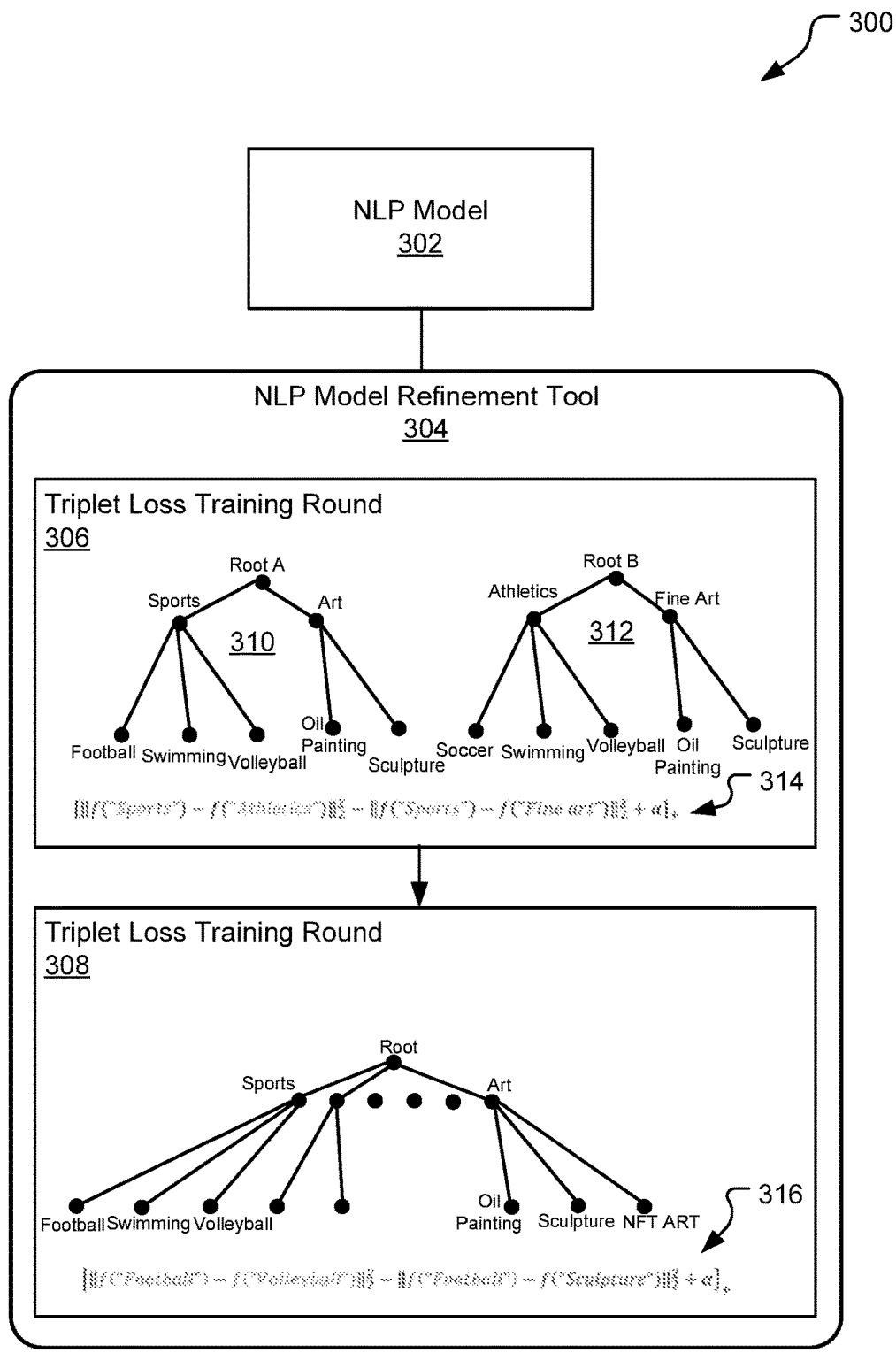
FIG. 3 illustrates example operations of a natural language processing (NLP) model refinement tool that performs actions effective to improve the model's understanding of similarity between various terms that belong to a hierarchical ontology.

FIG. 3 illustrates example operations 300 of an NLP model refinement tool 304 that performs actions to improve (further train) an NLP model 302 based on the hierarchical relations within one or more hierarchical ontologies to which various terms within the model belong. According to one implementation, the NLP model 302 is a generalized linguistic model that embeds terms as high dimensional vectors (e.g., embeddings) such that the distance between each pair of vectors correlates with a degree of learned similarity of the corresponding language terms. The NLP model refinement tool 304 educates the NLP model 302 about the similarities and differences of the hierarchical relations included within a first ontology 310 and a second hierarchical ontology 312 by applying a technique known as triplet loss.

The following discussion contemplates performing this triplet loss technique in two different ways to refine the model's understanding of similarities between terms within a given hierarchical ontology as well as similarities between terms belonging to different hierarchical ontologies. By example, portions of two example hierarchical ontologies 310 and 312 are shown in FIG. 3. In actual implementations, the hierarchical ontologies 310 and 312 may include hundreds or thousands of nodes.

Prior to the triplet loss refinement steps discussed below, it is assumed that all terms of the two hierarchical ontologies 310 and 312 are already represented as embeddings within the NLP model 302, such as in the matter described above with respect to FIG. 2. Because the NLP model 302 has not previously received training inputs conveying information about the relations in each hierarchical ontology, the vector distances between each of the terms within the NLP model 302 may not, at this point, be usable to reliably predict the types of similarities and differences that are apparent from human examination of the nodes and branches of either the two hierarchical ontologies 310 or 312. The triplet loss training techniques discussed below remedy this shortcoming by improving the model's representation of various terms such that the corresponding spatial separations between embeddings are better representative of the inter-hierarchical relations and cross-hierarchical relations that would be apparent to a human viewing the nodes and branches of the two hierarchical ontologies.

The model refinement process of FIG. 3 includes two rounds of triplet loss training (e.g., triplet loss training round 306 and triplet loss training round 308), each of which employ different sampling rules to sample many rounds (e.g., hundreds or thousands) of triplets. For each triplet sampled, the NLP model refinement tool 304 minimizes a distance between a first two embeddings of the triplet and maximizes a distance between a second two embeddings of the triplet. These distance minimizations and maximizations modify embeddings within the model in a self-supervised manner that does not require human intervention. These two sampling techniques discussed with respect to the triplet loss training round 306 and triplet loss training round 308 are not required to be performed in combination, and the use of either sampling technique individually is still effective to improve the NLP model 302. In some implementations where both sampling techniques are implemented in combination, an ordering of the sampling operations may be different than that shown in FIG. 3 (e.g., the triplet loss training round 308 may precede the triplet loss training round 306). These variations remain within the scope of the disclosed technology.

In the triplet loss training round 306, each triplet sampled has an anchor node and a positive node that belong to a different one of the two hierarchical ontologies 310 and 312 but that also share a like-named child node. With reference to the simplified versions of the first hierarchical ontology 310 and the second hierarchical ontology 312 examples shown in FIG. 3, a sampled triplet in this round may include an anchor node "sports" selected from the hierarchical ontology 310 and a positive node "athletics" selected from the hierarchical ontology 312 because both of these nodes have at least one like-named child node (e.g., volleyball and swimming). The sampled triplet additionally includes a negative node "fine art", randomly sampled from a set of nodes within either of the two ontologies that do not share any like-named children with the corresponding anchor node and positive node of the same triplet.

A loss function 314 (triplet loss) is applied to the triplet, which has the effect of modifying the embeddings corresponding to the nodes of the triplet to minimize the distance between the embeddings for the anchor node (sports) and the positive node (athletics), while also maximizing the distance between the embeddings for the anchor node (sports) and the negative node (fine art). When repeated many times over for many sampled triplets, this technique has the effect of reshaping the vector space of the NLP model 302 by moving embeddings that share like-named children closer to one another while pushing embeddings that do not share like-named children further apart. In this sense, the NLP model 302 begins to understand similarities and differences between the terms (nodes) that are in different ontologies due to the commonalities or lack thereof in the corresponding sets of child nodes associated with each term. This technique effectively improves cross-ontology relational representations within the model, allowing the model to better understand which terms in the ontology 310 are good matches (e.g., synonyms or otherwise similar in meaning) to those terms in the ontology 312.

In contrast to the above, the triplet loss training round 308 applies a slightly different triplet loss technique to help the NLP model 302 to better understand relations internal to a single one of the two hierarchical ontologies, effectively improving inter-ontology relation representations within the model as well. Specifically, each triplet sampled in the triplet loss training round 308 has an anchor node and a positive node that belong to a same one of the two hierarchical ontologies and that also share a parent node. In some implementations where the NLP model 302 already has an accurate representation of terms in a first ontology (e.g., the first hierarchical ontology 310), the triplet loss training round 308 may be employed exclusively with respect to triplets sampled from the second hierarchical ontology 312 to help the model quickly learn relations between nodes of this new hierarchical ontology to which the NLP model 203 has no or limited former exposure. In other implementations, the triplet loss training round 308 is employed with respect to triplets sampled from both the first hierarchical ontology 310 and the second hierarchical ontology 312 (e.g., with approximately equal sampling from both). This approach helps to refine the NLP model 302 to ensure that relations in both hierarchical ontologies are more accurately represented by the vector separations between embeddings of the NLP model 302.

By example, FIG. 3 illustrates a sampled triplet in the triplet loss training round 308 that includes an anchor node "football," a positive node "volleyball," and a negative node "sculpture," all selected from a same hierarchical ontology, which may be either one of the two hierarchical ontologies 310, 312. In this example, the positive node and the anchor node share a parent node "sports" that is not shared with the negative node of the same triplet. A loss function 316 is applied to the triplet, which has the effect of modifying the embeddings of the triplet to minimize the distance between the anchor node (football) and the positive node (volleyball), while also maximizing the distance between the anchor node (football) and the negative node (sculpture).

When repeated many times over with respect to triplets sampled from the first ontology and the second ontology, this technique has the effect of reshaping the vector space of the NLP model 302 by moving embeddings that share a parent node closer to one another while pushing embeddings that do not a parent node further apart. In this sense, the NLP model 302 begins to better understand similarities and differences between terms that are in a same hierarchical ontology.

As mentioned above, some implementations of the disclosed technology may employ either of the triplet loss training rounds 306 or 308 in isolation without employing the other. Still other implementations may provide for performing the triplet loss training round 308 prior to performing the triplet loss training round 306 (e.g., in an order opposite from that of the system 300).

Figure 4:
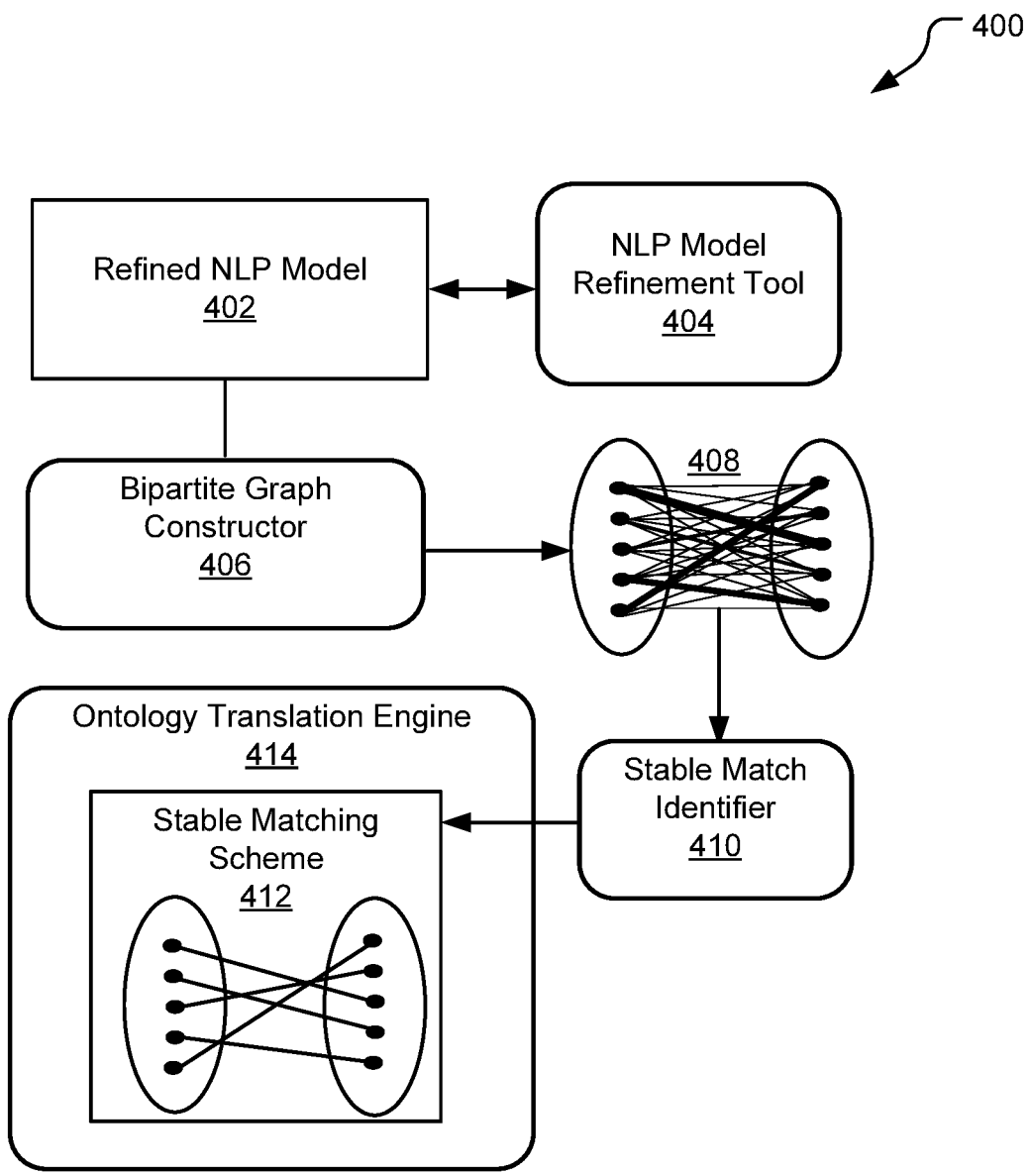
FIG. 4 illustrates an example system that performs operations to generate a stable matching scheme used by ontology translation engine to map terms of a first hierarchical ontology to corresponding terms a second hierarchical ontology.

FIG. 4 illustrates an example system 400 that performs operations to generate a stable matching scheme 412 used by ontology translation engine 414 to map terms of a first hierarchical ontology to corresponding terms a second hierarchical ontology.

The system 400 includes a refined NLP model 402 that has been trained by an NLP model refinement tool 404 using the triplet loss techniques described above with respect to FIG. 3. While refining the NLP model, the NLP model refinement tool 404 selectively modifies embeddings in the model to decrease the distance between pairs of terms that satisfy select hierarchical relations and to increase the distance between pairs of terms that do not satisfy such relations. For example, the embeddings for terms that share a like-named child node in different hierarchical ontologies may be moved closer together while the embeddings for terms that do not share a like-named child node are moved further apart. Additionally, or alternatively, the embeddings for terms that share a parent node in a same hierarchical ontology may be moved closer together while the embeddings for terms that do not share a parent node may be moved further apart.

The system 400 further includes a bipartite graph constructor 406 that generates a bipartite graph 408 with edges connecting nodes in the first hierarchical ontology to nodes in the second hierarchical ontology. The edges in the bipartite graph may be understood as "weights" that represent a computed degree of similarity between the embeddings of the refined NLP model 402 corresponding to the endpoint nodes of the edge that are associated with the two different ontologies. In one implementation, the bipartite graph constructor 406 computes a similarity metric with respect to every edge in the bipartite graph (e.g., for unique pair of nodes spanning the two ontologies). The similarity metric may, for example, be a cosign similarity or a dot product of the embeddings corresponding to endpoints of the edge. The bipartite graph constructor 406 outputs the bipartite graph 408 that includes edge weights indicating how similar each term of the first hierarchical ontology is to every single term of the second hierarchical ontology.

At this point, the computed edge weights can be used to readily identify similar terms; however, there is no clear 1-to-1 matching scheme usable to facilitate ontology translation. For example, a first term in the first ontology may be strongly correlated with many terms in the second ontology and those terms may, in fact, have even stronger match(es) with other terms of the first ontology than to the first term.

To facilitate ontology matching (a 1-to-1 translation between terms), a stable match identifier 410 employs a suitable algorithm to identify, from the bipartite graph, a stable matching scheme 412. As used herein, a true stable matching refers to a 1-to-1 matching that exists when there is no pair of nodes more similar to one another than to their respective matched partner nodes and no node that is more similar to an unmatched node that to its own matched node.

Notably, there may exist scenarios where the hierarchical ontologies are of different sizes in which case, a true stable matching may leave some nodes without matched partners. In these scenarios the stable match identifier 410 may perform some relaxation of constraints to provide matchings for those remaining unmatched nodes. Consistent with this, the term "stable matching scheme" is used herein to refer to a matching scheme that is a true stable matching except for the fact that the matching may not be exactly 1-to-1 (as one ontology may be larger than the other). Even in this case, however, the stable matching scheme 412 does not include any pair of nodes that are more similar to one another than to their respective matched partner nodes and does not include any node that is more similar to an unmatched node that to its own matched node One suitable algorithm for identifying the stable matching scheme is known as the Stable Marriage algorithm. Another suitable algorithm is known as the Hungarian matching algorithm. If the ontologies are different sizes, such an algorithm may be administered by first adding in dummy nodes to even out the sizes of the two ontologies. The algorithm is employed to identify a true stable matching, and then the stable match identifier 410 drops the dummy nodes to isolate their partners and re-matches those isolated nodes with their next best match in the bipartite graph to derive the stable matching scheme 412.

Ultimately, the stable matching scheme is 1-to-1 or very nearly 1-to-1, and each node in the larger one of the two ontologies is matched to its true "best match" (stable matching) partner. In the smaller of the two ontologies, some terms may be mapped to multiple terms of the larger ontology and at least one of the "multiple terms" is representative of its best (e.g., most semantically similar) match. The stable matching scheme 412 is used by an ontology translation engine 414 to facilitate ontology matching consistent with other description included herein.

Figure 5:
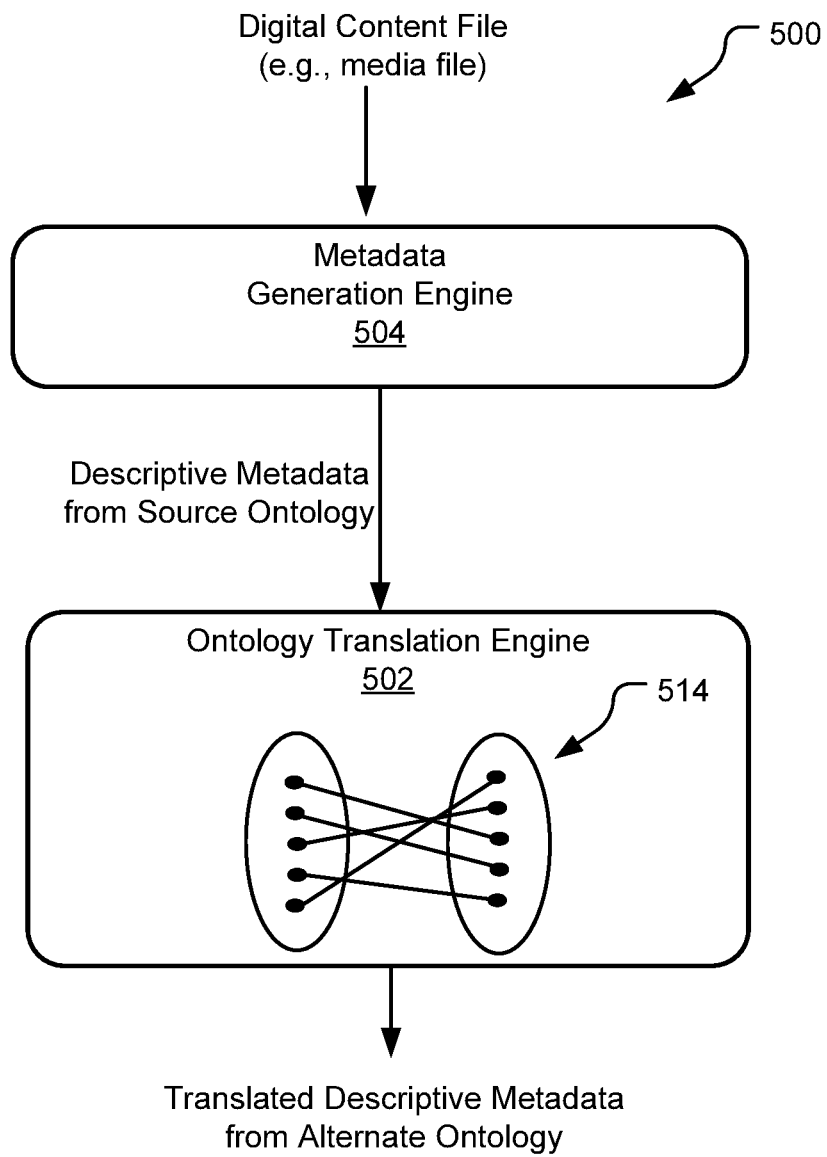
FIG. 5 illustrates an example system that uses an ontology translation engine to perform ontology matching between terms of different hierarchical ontologies.

FIG. 5 illustrates an example system 500 that uses an ontology translation engine 502 to perform ontology matching between terms of different hierarchical ontologies. According to one implementation, the ontology translation engine 502 employs a stable matching scheme 512 that is derived in a manner the same or similar to that discussed above with respect to FIG. 3 and FIG. 4 (e.g., including triplet loss refinements to an NLP model followed by partite graph construction and identification of a stable matching scheme). The system 500 includes a metadata generation engine 504 that receives as input a digital content file, such as a media file.

According to one implementation, the metadata generation engine 504 is a tool that was built to utilize a source ontology that is hierarchical in nature. The metadata generation engine 504 generates descriptive metadata for the input digital content file that includes relevant keywords selected from the source ontology are usable to index the content (e.g., to make it more searchable in the sense that the file is more likely to be returned in a user-initiated keyword-based query to a database that includes terms included within or related to those included in the descriptive metadata).

In some use cases, a particular enterprise may prefer to have their digital content indexed with terms selected from a hierarchical ontology that is different from the source ontology utilized by the metadata generation engine. In each of these cases, a suitable ontology translation engine (e.g., such as the ontology translation engine 502) is automatically generated per the techniques disclosed herein. As mentioned previously, the NLP model refinements discussed with respect to FIG. 3 can be implemented using self-supervised learning while the bipartite graph construction and stable matching scheme derivation of FIG. 4 can be performed by executing entirely automated processes. Consequently, the ontology translation engine 502 can be constructed for each different alternate ontology of choice without manual processing or human interventions aside from an action to initialize the processes and that provides the alternate ontology as input.

The ontology translation engine 502 implements a stable matching scheme 514 that is derived in a manner the same or similar to that described above with respect to FIG. 4. For each descriptive metadata term of the source ontology received as input, the ontology translation engine 502 outputs a corresponding "best match" term that of the alternate ontology and identified in the stable matching scheme 514 ("translated descriptive metadata").

Figure 6:
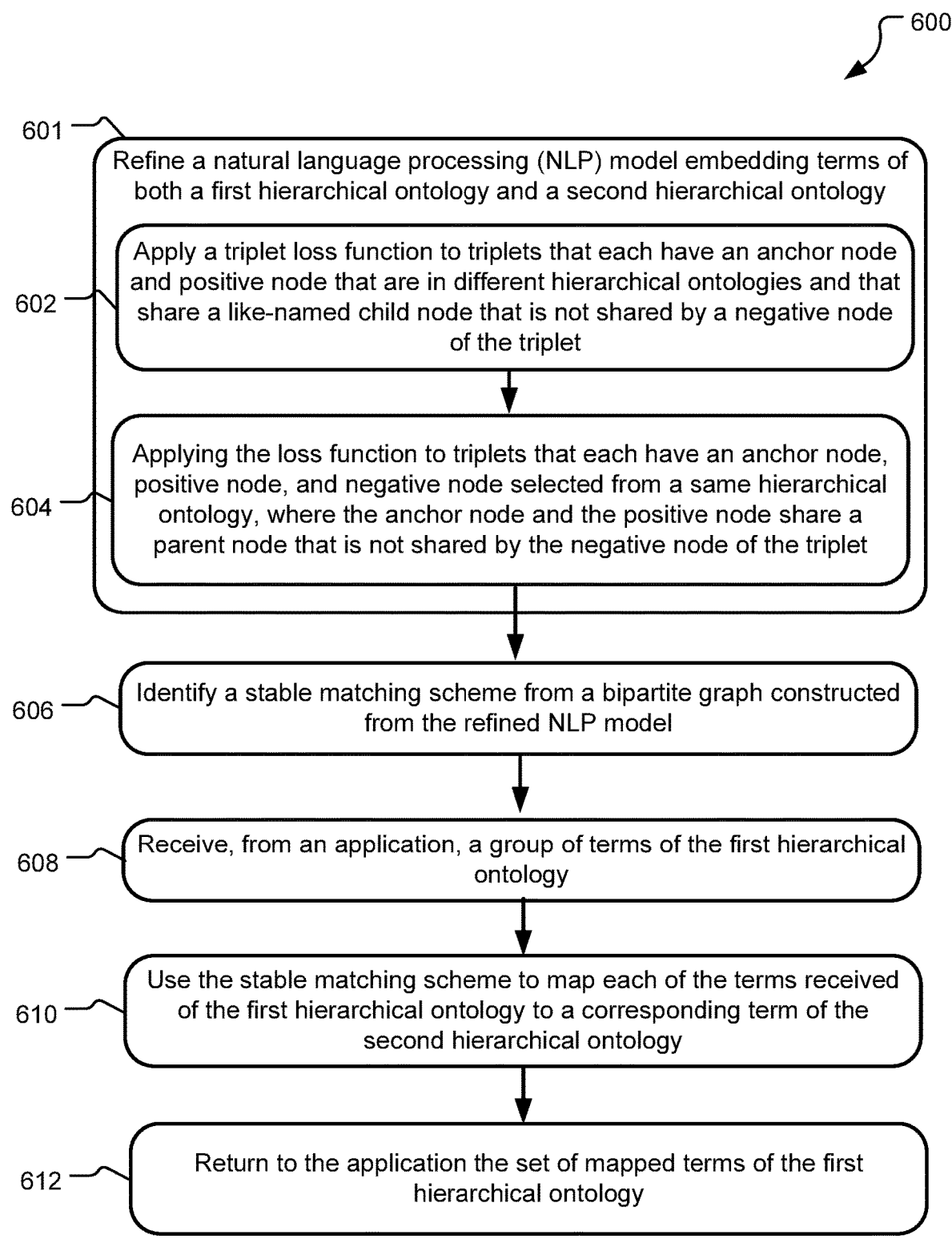
FIG. 6 illustrates example operations for ontology mapping between a first hierarchical ontology and a second hierarchical ontology

FIG. 6 illustrates example operations 600 for ontology mapping between a first hierarchical ontology and a second hierarchical ontology. A refinement phase 601 includes training operations for refining an NLP model to better understand how terms of the hierarchical ontologies relate to one another. The refinement phase 601 includes a first round of triplet loss training 602 that applies a triplet loss function to selected triplets that each have an anchor node and a positive node selected from different hierarchical ontologies and that share a like-named child node. Each of the selected triplets also includes a negative node that is selected from either one of the two ontologies. The negative node does not share the like-named child node with the anchor node and the positive node of the same triplet. The applied loss function decreases the vector separation between the two nodes of the triplet that share a like-named child while increasing the vector separation between two other nodes of the triplet (the anchor node and the negative node) that do not share a like-named child. This effectively teaches the NLP model that the terms sharing the like-named child are similar to one another.

The refinement phase 601 may optionally also include a second round of triplet loss training during which the loss function is applied to triplets that each include an anchor node, positive node, and negative node selected from a same hierarchical ontology. The anchor node and the positive node share a parent node that is not shared by the negative node. Application of the loss function to this triplet has the effect of decreasing the vector separation between two of the nodes of the triplet that share the parent (the anchor and the positive) while increasing the vector separation between two other nodes of the triplet that do not share the parent (the anchor and the negative).

An identification operation 606 identifies a stable matching scheme pairing each term of the first hierarchical ontology with a term of the second hierarchical ontology. According to one implementation, the identification operation 606 further includes constructing a bipartite graph from the refined NLP model and deriving the stable matching scheme from the bipartite graph, such as by applying a stable marriage algorithm or other suitable algorithm.

A receiving operation 608 receives, e.g., from an application, a group of terms of the first hierarchical ontology and a mapping operation 610 uses the stable matching scheme to map each of the terms received of the first hierarchical ontology to a corresponding term of the second hierarchical ontology. In one implementation, the application is a metadata generation engine that performs operations the same or similar to the metadata generation engines described herein with respect to FIGS. 1 and 5.

An output operation 612 returns, e.g., to the application, the set of mapped terms of the second hierarchical ontology that best correspond to the received terms of the first hierarchical ontology. In some implementations, the operations 600 further include an indexing operation that appends the set of mapped terms to metadata of a digital content file such that the digital content file may be indexed in association with the terms and returned by a search engine responsive to a keyword-based database search that includes one or more of the mapped terms as a search term.

Figure 7:
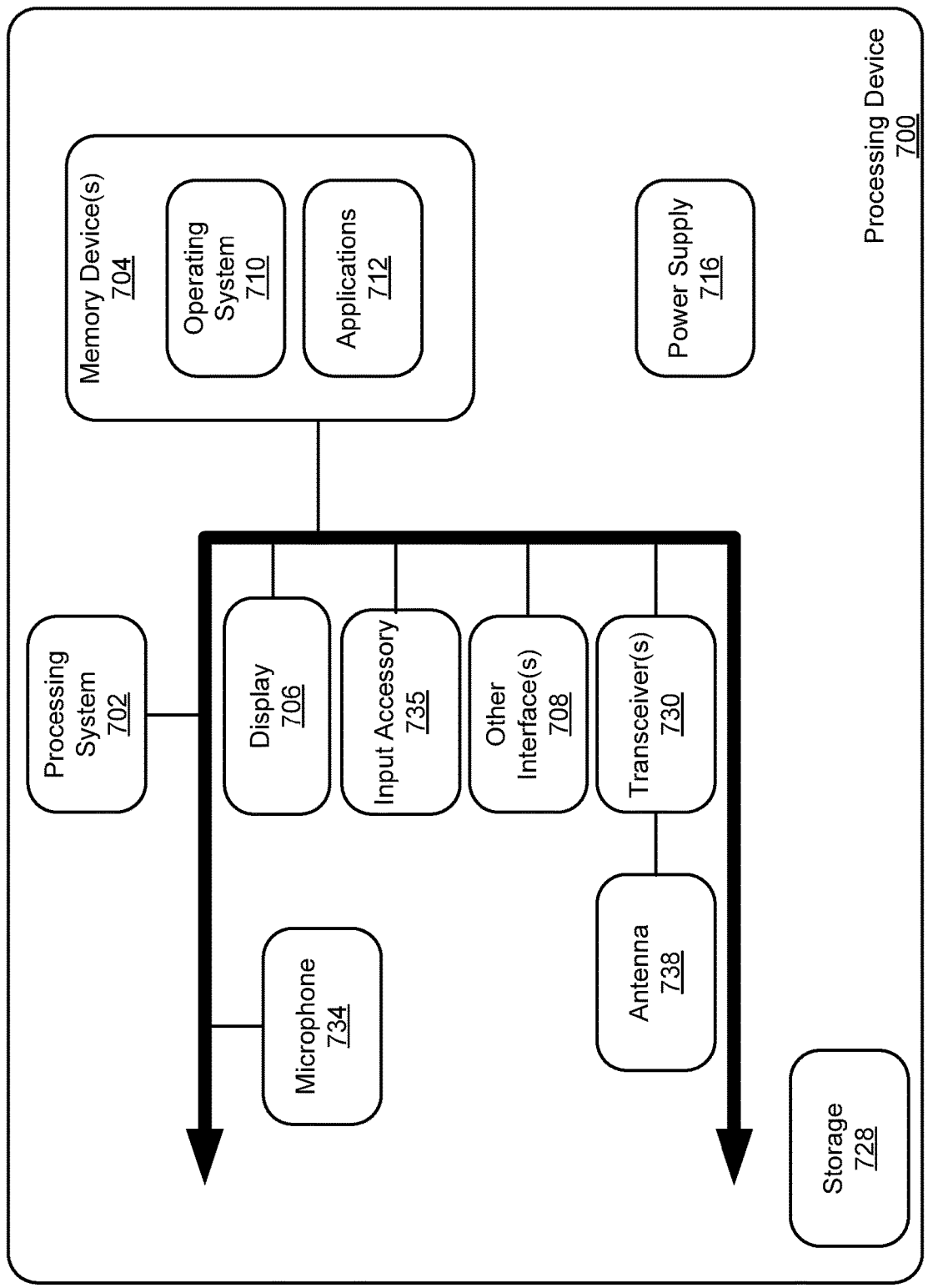
FIG. 7 illustrates an example schematic of a processing device suitable for implementing aspects of the disclosed technology.

FIG. 7 illustrates an example schematic of a processing device 700 suitable for implementing aspects of the disclosed technology. The processing device 700 includes a processing system 702, memory device(s) 704, a display 706, and other interfaces 708 (e.g., buttons). The processing system 702 includes one or more processors, (CPUs, GPUs, etc.)

The memory 704 generally includes both volatile memory (e.g., RAM) and non-volatile memory (e.g., flash memory). An operating system 710 may reside in the memory 704 and be executed by the processing system 702. A natural language processing model may also be stored in the memory 704 or in distributed memory of multiple different storage devices.

One or more applications 712 (e.g., the metadata generation engine 102, the ontology translation engine 110, the NLP model refinement tool 304, the bipartite graph constructor 406, or the stable match identifier 410) are loaded in the memory 704 and executed on the operating system 710 by the processing system 702. The applications 712 may receive inputs from one another as well as from various input local devices such as a microphone 734, and an input accessory 735 (e.g., keypad, mouse, stylus, touchpad, gamepad, racing wheel, joystick).

Additionally, the applications 712 may receive input from one or more remote devices, such as remotely-located smart devices, by communicating with such devices over a wired or wireless network using more communication transceivers 730 and an antenna 738 to provide network connectivity (e.g., a mobile phone network, Wi-Fi®, Bluetooth®). The processing device 700 may also include one or more storage devices 728 (e.g., non-volatile storage). Other configurations may also be employed.

The processing device 700 further includes a power supply 716, which is powered by one or more batteries or other power sources and which provides power to other components of the processing device 700. The power supply 716 may also be connected to an external power source (not shown) that overrides or recharges the built-in batteries or other power sources.

The processing device 700 may include a variety of tangible computer-readable storage media and intangible computer-readable communication signals. Tangible computer-readable storage can be embodied by any available media that can be accessed by the processing device 700 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 700. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, intangible communication signals include wired media such as a wired network or direct-wired connection, and wireless media such as acoustic, RF, infrared, and other wireless media.

(A1) An example method for mapping semantically similar terms across different ontologies provides operations to refine a natural language processing (NLP) model that encodes terms of a first hierarchical ontology and of a second hierarchical ontology as embeddings in a vector space in which spatial proximity between the embeddings is correlated with similarity between the associated terms. The operations include at least a first round of triplet loss training effective to thereby decrease separation between select pairs of the embeddings sampled from different ontologies that satisfy a first hierarchical relation while increasing separation between other pairs of the embeddings that do not satisfy the first hierarchical relation. The method further provides for determining, from the refined NLP model, a stable matching scheme that matches each term in the first hierarchical ontology with a corresponding term of the second hierarchical ontology, and for receiving a group of terms of the first hierarchical ontology from an application and mapping, based on the stable matching scheme, each received term in the group of the first hierarchical ontology to a corresponding term of the second hierarchical ontology. The method further provides for returning the mapped terms from the second hierarchical ontology to the application. The method of A1 is advantageous because it provides a software mechanism for modifying terms of a first ontology that may be output from a variety of different applications to corresponding most-similar terms of a second ontology (which may be preferred by the user) and doing so without changing the underlying code of the application.

(A2) In another implementation of A1, the processor-implemented method further includes determining the stable matching scheme by constructing a bipartite graph with nodes and edges. The nodes are formed by the embeddings of the first hierarchical ontology and the second hierarchical ontology while the edges extend between pairs of the nodes and are each characterized by an edge weight representing similarity of the nodes forming endpoints to the edge. The stable matching scheme is determined for the nodes in the bipartite graph and based on the edge weights.

(A3) In another implementation of A1 or A2, the group of terms of the first hierarchical ontology are previously generated based on content extracted from a digital content file. The application adds the corresponding, mapped terms from the second hierarchical ontology to metadata that is used to index the digital content file. The method of A3 is advantageous because it provides for indexing a file with descriptive terms of a customer-preferred ontology (e.g., the second ontology) that may be different from an ontology that is used by an application to generate descriptive metadata for indexing the digital content.

(A4) In another implementation of A1-A3, the operations of the first round of triplet loss training decrease separation between select pairs of the embeddings sampled from different ontologies that share a like-named child node while increasing separation between other pairs of the embeddings that do not share a like-named child node.

(A4) In another implementation of A1-A4, performing the first round of triplet loss training includes selecting triplets from the embeddings of the NLP model that each identify an anchor node and a positive node selected from different hierarchical ontologies. The anchor node and the positive node share a like-named child node that is not shared with a negative node of the triplet. The methods of A3 and A4 refine the NLP model to learn similarities and differences among pairs of the terms selected from the different ontologies.

(A5) In another implementation of A1-A4, the method further includes performing a second round of triplet loss training to further refine the NLP model. Triplets selected for the second round of triplet loss training each include an anchor node and a positive node that share a parent node within the same hierarchical ontology and further include a negative node that is selected from the same hierarchical ontology, wherein the negative node does not share a parent node with either the anchor node or the positive node. The method of A5 helps the NLP model to better understand the hierarchical relations internal to each of the different ontologies.

(A6) In another implementation of A1-A5, determining the stable matching scheme further comprises executing a stable marriage algorithm. This algorithm ensures that each term of the first ontology is matched to its single most similar term of the second ontology while simultaneously ensuring that there are no pairs of nodes more similar to one another than to their respective matched partner nodes and no node that is more similar to an unmatched node that to its own matched node.

(A7) In another implementation of A1-A5, the bipartite graph includes edges connecting each nodes of the first hierarchical ontology to one or more nodes of the second hierarchical ontology. A weight of each edge in the bipartite graph is determined by computing a similarity metric with respect to embeddings corresponding to nodes forming endpoints of the edge. The method of A7 provides for objectively assessing the similarity of pairs of terms without relying on subjective human input.

In another aspect, some implementations include a computing system for mapping terms of a first hierarchical ontology to corresponding most-similar terms of a second hierarchical ontology. The computing system includes hardware logic circuitry that is configured to perform any of the methods described herein (e.g., methods A1-A7).

In yet another aspect, some implementations include a computer-readable storage medium for storing computer-readable instructions. The computer-readable instructions, when executed by one or more hardware processors, perform any of the methods described herein (e.g., methods A1-A7).

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of example implementations.

What is claimed is:

1. A processor-implemented method for mapping terms across different ontologies, the method comprising:
   refining a natural language processing (NLP) model that encodes terms of a first hierarchical ontology and of a second hierarchical ontology as embeddings in a vector space in which spatial proximity between the embeddings is correlated with similarity between the associated terms, the refining including a first round of triplet loss training effective to decrease a separation between select pairs of the embeddings sampled from different ontologies that satisfy a first hierarchical relation while increasing separation between other pairs of the embeddings that do not satisfy the first hierarchical relation;
   determining, from the NLP model, a stable matching scheme that matches each term in the first hierarchical ontology with a corresponding term of the second hierarchical ontology;
   receiving a group of terms of the first hierarchical ontology; and
   mapping, based on the stable matching scheme, each term in the group of terms of the first hierarchical ontology to its associated corresponding term of the second hierarchical ontology; and
   returning the corresponding terms from the second hierarchical ontology.

2. The processor-implemented method of claim 1, wherein determining the stable matching scheme further comprises:
   constructing a bipartite graph with nodes and edges connecting respective pairs of the nodes, the nodes being the embeddings of the first hierarchical ontology and the second hierarchical ontology and each edge of the edges having an edge weight representing a similarity between respective nodes forming endpoints of the edge;
   determining the stable matching scheme for the nodes in the bipartite graph.

3. The method of claim 2, wherein the bipartite graph includes edges connecting each node of the first hierarchical ontology to one or more nodes of the second hierarchical ontology, and wherein an edge weight of each edge in the bipartite graph is determined by computing a similarity metric with respect to embeddings corresponding to nodes coupled to the edge.

4. The processor-implemented method of claim 1, wherein the group of terms of the first hierarchical ontology are associated with metadata of a digital content file and wherein the corresponding terms from the second hierarchical ontology are added to the metadata of the digital content file.

5. The method of claim 1, wherein performing the first round of triplet loss training decreases separation between select pairs of the embeddings sampled from different ontologies that share a like-named child node while increasing separation between other pairs of the embeddings that do not share a like-named child node.

6. The method of claim 1, wherein performing the first round of triplet loss training includes selecting triplets from the embeddings of the NLP model that each identify an anchor node and a positive node selected from different hierarchical ontologies, the anchor node and the positive node sharing a like-named child node that is not shared with a negative node of the triplet.

7. The method of claim 1, further comprising:
   performing a second round of triplet loss training to further refine the NLP model, wherein triplets selected for the second round of triplet loss training each include an anchor node and a positive node that share a parent node within a same hierarchical ontology and further include a negative node that is selected from the same hierarchical ontology, wherein the negative node does not share a parent node with either the anchor node or the positive node.

8. The method of claim 1, wherein determining the stable matching scheme further comprises executing a stable marriage algorithm.

9. A system comprising:
   a processing system;
   memory;
   a natural language processing (NLP) model refinement tool stored in the memory and executable by the processing system to refine an NLP model that encodes terms of a first hierarchical ontology and of a second hierarchical ontology as embeddings in a vector space in which distances between the embeddings correlate with similarity between the associated terms, the refining of the NLP model including at least:
   performing a first round of triplet loss training effective to decrease separation between select pairs of the embeddings sampled from different ontologies that satisfy a first hierarchical relation while increasing separation between other pairs of the embeddings that do not satisfy the first hierarchical relation;
   a stable match identifier stored in the memory and executable by the processing system that determines a stable matching scheme for the embeddings of the refined NLP model, the stable matching scheme being a scheme that matches each term in the first hierarchical ontology with a corresponding term of the second hierarchical ontology; and
   an ontology translation engine stored in the memory and executable by the processing system to:
   receive terms of the first hierarchical ontology from an application;

use the stable matching scheme to map each of the terms of the first hierarchical ontology to its associated corresponding term of the second hierarchical ontology; and returning the corresponding terms from the second hierarchical ontology to the application.

10. The system of claim 9, wherein the stable match identifier is further executable to:

construct a bipartite graph with nodes and edges connecting respective pairs of the nodes, the nodes being the embeddings of the first hierarchical ontology and the second hierarchical ontology and each edge of the edges having an edge weight representing a similarity between respective nodes forming endpoints of the edge; and determine the stable matching scheme for the nodes in the bipartite graph.

11. The system of claim 10, wherein the stable match identifier executes a stable marriage algorithm to identify the stable matching scheme.

12. The system of claim 10, wherein the bipartite graph includes edges connecting each of the nodes of the first hierarchical ontology to one or more nodes of the second hierarchical ontology, and wherein an edge weight of each edge in the bipartite graph is determined by computing a similarity metric with respect to embeddings corresponding to nodes coupled to the edge.

13. The system of claim 9, wherein the terms of the first hierarchical ontology are associated with metadata of a digital content file and wherein the corresponding terms from the second hierarchical ontology are added to the metadata of the digital content file by the application.

14. The system of claim 9, wherein performing the first round of triplet loss training includes selecting triplets from the embeddings of the NLP model that each identify an anchor node and a positive node selected from different hierarchical ontologies, the anchor node and the positive node sharing a like-named child node that is not shared with a negative node of the triplet.

15. The system of claim 9, wherein the NLP model refinement tool is further executable to:

performing a second round of triplet loss training to further refine the NLP model, wherein triplets selected for the second round of triplet loss training each include an anchor node and a positive node that share a parent node within a same hierarchical ontology and further include a negative node that is selected from the same hierarchical ontology, wherein the negative node that does not share a parent node with either the anchor node or the positive node.

16. A tangible computer-readable storage media encoding computer executable instructions for executing a computer process comprising:

refining a natural language processing (NLP) model that encodes terms of a first hierarchical ontology and of a second hierarchical ontology as embeddings in a vector space in which spatial proximity between the embeddings is correlated with similarity between the associated terms, the refining including at least a first round of triplet loss training effective to decrease separation between select pairs of the embeddings sampled from different ontologies that satisfy a first hierarchical relation while increasing separation between other pairs of the embeddings that do not satisfy the first hierarchical relation;

determining, from the refined NLP model, a stable matching scheme that matches each term in the first hierarchical ontology with a corresponding term of the second hierarchical ontology;

receiving terms of the first hierarchical ontology;

using the stable matching scheme to map each of the terms of the first hierarchical ontology to its associated corresponding term of the second hierarchical ontology; and returning the corresponding terms from the second hierarchical ontology.

17. The tangible computer-readable storage media of claim 16, wherein determining the stable matching scheme further comprises:

constructing a bipartite graph with nodes and edges connecting respective pairs of the nodes, the nodes being the embeddings of the first hierarchical ontology and the second hierarchical ontology and each edge of the edges having an edge weight representing a similarity between respective nodes forming endpoints of the edge;

determining the stable matching scheme for the nodes in the bipartite graph.

18. The tangible computer-readable storage media of claim 16, wherein the terms of the first hierarchical ontology are associated with metadata of a digital content file and wherein the corresponding terms from the second hierarchical ontology are added to the metadata of the digital content file.

19. The tangible computer-readable storage media of claim 16, wherein the first round of triplet loss training includes selecting triplets from the embeddings of the NLP model that each identify an anchor node and a positive node selected from different hierarchical ontologies, the anchor node and the positive node sharing a like-named child node that is not shared with a negative node of the triplet.

20. The tangible computer-readable storage media of claim 16, wherein the refining further includes performing a second round of triplet loss training that includes selecting triplets that each include an anchor node and a positive node that share a parent node within a same hierarchical ontology and further include a negative node that is selected from the same hierarchical ontology, wherein the negative node does not share a parent node with either the anchor node or the positive node.

* * * * *